May 5, 1931. C. S. BRAGG ET AL 1,803,957
POWER ACTUATOR
Filed Nov. 7, 1927 4 Sheets-Sheet 2

Patented May 5, 1931

1,803,957

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed November 7, 1927. Serial No. 231,724.

Our invention consists in the novel features hereinafter described, reference being had to the accompanying drawings which show several embodiments of the same selected by us for purposes of illustration, and the said invention is fully disclosed in the following description and claims.

Our invention is an improvement in power actuators for use in connection with automotive vehicles, and especially in connection with the operation of the brake mechanism thereby. The object of our invention is to provide in connection with the controlling valve mechanism for the actuator and the operator operated part for operating the valve mechanism, means whereby the operator is enabled to determine by the increased resistance to the movement of the operator operated part, in a direction to effect a power stroke of the actuator for applying the brake mechanism, for example, how much pressure the piston of the actuator is exerting on the brakes or other part to be actuated, by the increased resistance against his foot, for example, where a pedal lever is employed, and at the same time to apply the physical force of the operator required to overcome both the initial resistance of such retracting means as may be employed to return the operator operated part and the valve mechanism to its normal position, as well as to overcome such increased resistance, to the brake mechanism or the part to be operated, so that it is neither wasted nor subtracted from the power exerted by the actuator.

According to our present invention, we employ in connection with a valve casing, which is in communication with the cylinder of the power actuator on at least one side of the piston therein, and also in communication with sources of higher and lower fluid pressures, a diaphragm of considerable area, so that the maximum differential of fluid pressures thereon, applied to the operator operated part, will offer material resistance to the movement thereof, which diaphragm is connected with the operator operated part and acts in conjunction with the controlling valve mechanism, of which it may form a part, to establish an equalization of pressures on opposite faces of the diaphragm when the valve mechanism is in released position, and to subject the opposite faces of the diaphragm to the higher and lower fluid pressures when the valve mechanism is moved in a direction to produce a power stroke of the piston, the differential of said fluid pressures increasing gradually substantially in accordance with the differential of fluid pressures on opposite faces of the piston within the cylinder of the actuator, and being exerted on the diaphragm in a direction to add its resistance to whatever initial resistance may be provided for returning the operator operated part and connected parts to released position, means being also provided whereby when the power actuator has been operated to a desired extent, the operator, by slightly relieving his pressure on the operator operated part, may permit the diaphragm to seat on a portion of the casing and transfer the increased pressure above referred to from the operator operated part, so that the operator will not need to sustain this increased pressure while holding the brake mechanism as applied, for example, the parts being so constructed that a very light spring or other retracting means may be employed to restore the operator operated part and valve mechanism to released position.

Our invention also comprises certain novel features of construction and combination of parts hereinafter fully described and particularly pointed out in the claims.

Referring to the accompanying drawings.

Figure 1:
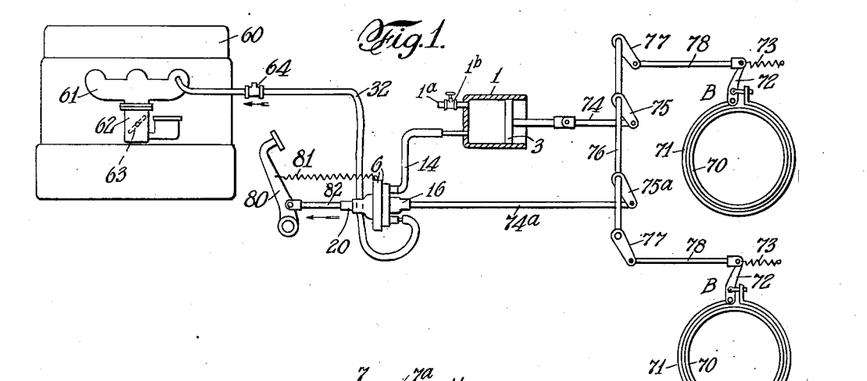
Fig. 1 is a diagrammatic view of an installation of brake mechanism in an automotive vehicle in connection with a power actuator, and containing an embodiment of our invention in which the controlling valve mechanism for the actuator is located exterior to the cylinder thereof.
Figure 2:
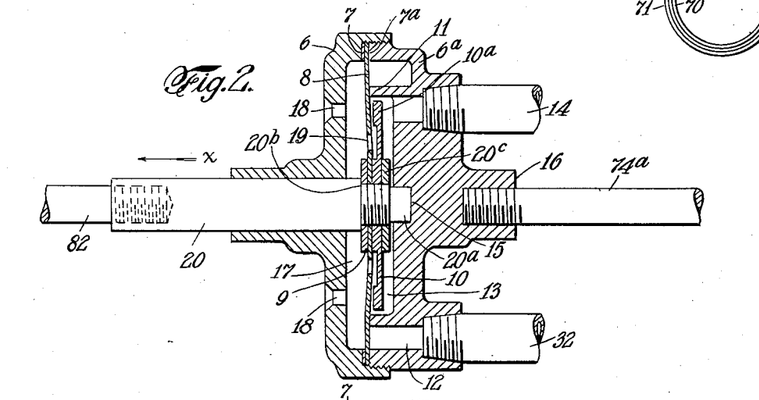
Fig. 2 is an enlarged sectional view of the valve mechanism illustrated in Fig. 1, showing it in released position.
Figure 3:
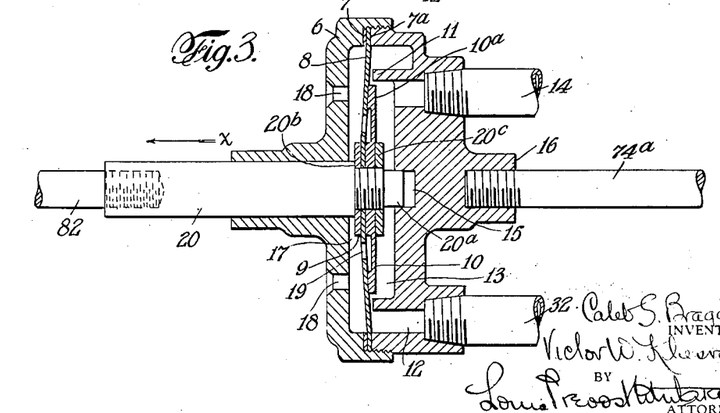
Fig. 3 is a view similar to Fig. 2, showing the valve mechanism in the position to which it is moved to effect a power stroke of the actuator.

In Figs. 1, 2 and 3, we have shown an embodiment of our invention in which the power actuator which comprises a cylinder, 1, open at one end to the atmosphere, is provided with a piston, 3, working therein, the piston being connected to a part to be operated, as brake mechanism of the vehicle, indicated at B, B, in Fig. 1, for example, which may be of any desired type, the actuator being controlled by valve mechanism located exterior to the actuator cylinder in linkage between the operator operated part and the brake mechanism, the valve mechanism being constructed as hereinafter described, so as to enable the operator to apply his physical force directly to the brake mechanism either in addition to that exerted by the actuator, or to apply the brakes by physical force alone in case of failure of power. In this instance the brake mechanisms are indicated as each comprising a brake drum, 70, brake band, 71, brake lever, 72, provided with a retracting spring, 73, the brake lever, 72, being connected by links, 78, and arms, 77, with a rock shaft, 76, provided with an arm, 75, to which the piston of the actuator is connected by a link, 74. The actuator is operated in this instance by connecting the cylinder, 1, forward of the piston alternately with the atmosphere and with a source of suction, which may be conveniently obtained by a connection to the suction passage of an internal combustion engine for propelling the vehicle, indicated at 60, and provided with a suction passage, 61, of which the intake manifold forms a part, a carburetor, 62, connected with the suction passage, and a throttle valve, 63, for said suction passage located between the carburetor and the engine cylinders.

The controlling valve mechanism comprises a valve casing composed of two members, 6 and 6$^a$, which are conveniently provided respectively with interior and exterior threaded portions, the casing members being provided with annular clamping portions, 7 and 7$^a$, so that they may be screwed together upon the marginal portions of a diaphragm, 8, to effect a sealing engagement between the edges of the diaphragm and the casing. The diaphragm is provided with a central aperture to engage a reduced portion, 20$^a$, of a valve actuating part, 20, extending through a central aperture in the casing member, 6, and provided within the casing with a shoulder, 20$^b$. A metal washer, 9, is interposed between the shoulder, 20$^b$, and the diaphragm, 8, and in rear of the diaphragm the reduced portion, 20$^a$, is provided with a disc valve, 10, having annular portions, 10$^a$, for engaging the diaphragm and for making an air tight connection therewith. The disc valve, diaphragm and washer, 9, are clamped together against the shoulder, 20$^b$, by a suitable nut, 20$^c$, on the reduced portion of the valve stem or valve actuating part, 20. The casing member, 6$^a$, is also provided with an annular seat, indicated at 11, for normally engaging the diaphragm, 8, and forming an air tight connection therewith, when the valve mechanism is in released position as shown in Fig. 2. This seat divides the space within the casing member, 6$^a$, into an exterior annular chamber, 12, and an interior central chamber, 13. The central chamber, 13, is connected in this instance by a pipe, 14, a portion of which at least is flexible, with the cylinder, 1, of the actuator between the piston and the closed end of the cylinder. The annular chamber, 12, of the valve casing is connected by a pipe, 32, a portion at least of which is flexible with the suction passage of the internal combustion engine, between the throttle valve and the engine cylinders, and this pipe is provided with a check valve, 64, opening in the direction of the small arrow adjacent thereto. The casing member, 6$^a$, is also provided with a recess, 15, surrounding the reduced portion, 20$^a$, of the valve stem, 20, the rear end of said recess serving to limit the movement of the valve stem to released position under the action of the retracting means hereinafter referred to, the movement of the valve stem in the opposite direction being limited by the engagement of the metal washer, 9, with the inner face of the casing member, 6, thus providing a limited amount of lost motion between the valve stem and the valve casing. The casing member, 6$^a$, is also provided with a rearwardly extending hub portion, 16, which is interiorly threaded to receive a connecting rod, or link, 74$^a$, connected to an arm 75$^a$, on the rock shaft, 76, connected with the brake mechanism. The valve actuating part, or stem, 20, is provided in a similar manner by a link rod, 82, with an operator operated part, in this instance a foot lever, 80, provided with a retracting spring, 81, connected with the valve casing, 6. The casing member, 6, is provided with a chamber, 17, on the forward side of the diaphragm, 8, which is at all times in communication with the atmosphere, in this instance by means of apertures, 18, in the casing member, 6, and the diaphragm itself is in this instance provided with higher pressure inlet apertures indicated at 19, within the annular sealing portions, 10$^a$, of the disc valve, 10.

It will be noted that the valve actuating part or valve stem, 20, projects through an aperture in the wall of the casing, both sides of which are always subjected to atmospheric pressure, and that the portion of the interior of the casing adjacent to this wall is always sealed from the portions of the casing where vacuum exists by the diaphragm and disc valve. It is therefore unnecessary to provide any sealing means between the valve actuating part or stem, 20, and the guiding aperture in the valve casing through which it passes, thus simplifying the construction of the valve and cheapening its cost.

Assuming that the parts of the valve mechanism are in the released position, indicated in Fig. 2, and the engine is running with the throttle closed, rarification will be produced in the suction passage of the engine, and the air will be exhausted from the suction pipe, 32, and the annular suction chamber, 12, which in this position of the valve mechanism is disconnected from the central chamber, 13, owing to the fact that the diaphragm, 8, is in sealing contact with the annular seat, 11. The valve actuating part, 20, being in its most rearward position, under the action of its retracting spring, 81, the sealing members, 10$^a$, of the disc valve, 10, are not in contact with the diaphragm, 8, and therefore communication is established between the cylinder and the atmosphere through the pipe, 14, chamber 13, apertures, 19, in the diaphragm and apertures, 18, in the casing member, 6. In this released position of the valve mechanism it will be observed that the diaphragm, 8, is subjected to atmospheric pressure on both faces, so that the fluid pressures thereon are equalized, and it will also be understood that the piston of the actuator is likewise subjected to atmospheric pressures on both faces in the released position of the valve mechanism, or in other words, submerged in the higher or atmospheric pressure.

To effect a power stroke of the piston, the operator will place his foot on the foot lever and move it forwardly in the direction of the arrow $x$, in Fig. 2. The first portion of this movement will bring the sealing portions, 10$^a$, of the disc valve, 10, into engagement with the diaphragm, 8, and close off communication between the cylinder and the air inlet apertures, 19, 18. As the fluid pressures are equal on the opposite faces of the portion of the diaphragm moved to effect the closing of the disc valve, 10, this movement will only be resisted by the resistance of the retracting means, as the spring, 81, employed to restore the parts to normal position. As soon as the disc valve, 10, has been moved into engagement with the diaphragm, the further movement of the pedal will move the diaphragm, 8, away from the annular seat, 11, upon which it is normally held in the released position of the valve mechanism, due to the suction or rarification in chamber, 12, and thereby connecting the cylinder and the chamber, 13, with the annular suction chamber, 12, and with the suction passage of the engine, as shown in Fig. 3. Exhaustion of the air in the cylinder forward of the piston will immediately begin, and the piston will move forward under the action of the atmospheric pressure on its rear face. As the degree of rarification in the cylinder and within the casing member, 6$^a$, increases, the differential of fluid pressure on the diaphragm, the forward face of which is always exposed to atmospheric pressure, will increase in direct proportion to the increase in the differential of fluid pressures in the power actuator, and the differential of fluid pressures on the diaphragm, 8, will be transmitted through the valve actuating part, 20, and rod, 82, to the foot lever, and increase the initial resistance in substantial proportion to the power exerted by the actuator piston, so that the operator will be enabled to determine accurately the amount of power which the actuator is exerting on the brakes by the increased resistance which he encounters in moving the foot lever forward and keeping the diaphragm away from its seat. It will be noted that when the diaphragm is moved away from its seat, 11, by the disc valve, 10, substantially the entire rear face of the diaphragm, including the rear face of the disc valve, 10, which in that position becomes in effect a part of the diaphragm, is exposed to suction or lower fluid pressure, while substantially the entire forward face of the diaphragm and disc valve, 10, is exposed to the higher pressure fluid, so that the differential of fluid pressures acts on practically the entire surface of the diaphragm, and will provide a resistance which may be determined by the size or diameter of the diaphragm and valve casing.

As the valve casing is connected with brake mechanism or other part to be actuated and therefore with the piston of the actuator, the valve casing will move forward with the piston and the movement will be continued so long as the operator exerts sufficient pressure on the pedal to hold the diaphragm away from its seat, until the piston of the actuator is exerting its maximum pressure. If the forward movement of the pedal is stopped, the slight continuing movement of the piston and the valve casing will permit the diaphragm, 8, to re-engage its seat, 11, without opening the valve, 10, thus holding the brakes as applied, and at the same time transferring considerable portion of the differential of fluid pressures on the diaphragm from the valve actuating rod, 20, to the valve seat, 11, and the valve casing, so that the operator does not have to sustain the whole of the resistance, which is a desirable feature, especially in connection with brake mechanism, as in applying the brakes more or less continuously on a long down grade. If the operator releases his pressure on the pedal sufficiently to permit the valve, 10, to disengage the diaphragm, air will be admitted to the cylinder and an immediate release of the braking surfaces will follow, while the brakes may be instantly reapplied by slight forward movement of the pedal sufficiently to again bring the valve, 10, in contact with the diaphragm, 8, and move the latter away from its seat, at which time the operator will again have to overcome the additional resistance provided by the differential of fluid pressures on the diaphragm. When the actuator has applied its maximum power to the brake mechanism or other part to be operated, the operator may further depress the pedal so as to bring the metal washer, 9, into contact with the member, 6, of the valve casing, and thereby apply his physical force to the brake mechanism or other part to be operated through the valve casing, and the connecting rod, 74ª, in addition to the power exerted by the acutator, and in like manner the operator may positively operate the brake mechanism or other part to be operated by physical force alone in case of failure of power, or when the engine is not running, in which case the movement of the valve actuating part, 20, to bring the stop or washer, 9, into engagement with the casing member, 6, will place the valves in position to vent the cylinder and prevent compression therein.

It will also be noted that all of the physical force exerted by the operator in overcoming both the initial resistance to the movement of the operator operated part and the increased resistance due to the differential of fluid pressures on the diaphragm, 8, will be effectively transmitted to the valve casing and thereby to the brake mechanism or other part to be operated, so that none of this physical force required to overcome either the initial resistance or the increased resistance whereby the operator is enabled to determine the extent of power exerted by the actuator, is lost, but on the contrary it is conserved and applied to the part to be operated in the direction of the stroke of the actuator piston. It will be understood that when the operator desires to release the brakes he will release the pedal lever, permitting the retracting spring 81, to restore the valve mechanism to its original position, seating the diaphragm on the seat, 11, and separating the disc valve, 10, therefrom, thus placing the cylinder forward of the piston in communication with the atmosphere and equalizing pressures therein, and permitting an instant release of the brakes and their return to normal position under the action of their retracting spring, 73.

Figure 4:
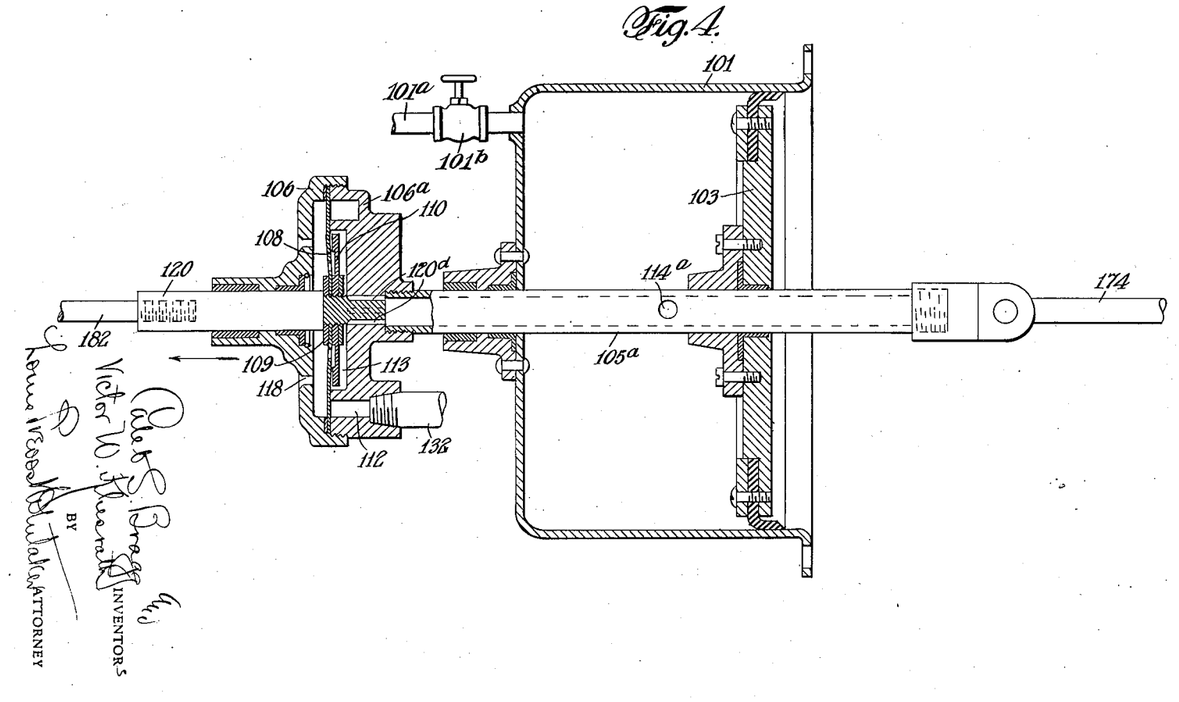
Fig. 4 is a detail view showing a slight modification of the valve mechanism illustrated in Figs. 2 and 3, screwed to and carried by the piston rod of the actuator.

In Fig. 4, we have illustrated a slight modification of our invention in which the valve casing instead of being connected to the brake mechanism independently of the piston as illustrated in Figs. 1, 2 and 3, is connected with the piston, and in this instance carried by a hollow piston rod. In this instance the parts corresponding with those shown in Figs. 1, 2 and 3 are given the same reference characters with the addition of 100, to avoid repetition. The valve casing member, 106ª, is shown connected with a hollow piston rod, 105ª, extending through the forward end of the actuator cylinder, 101, and connected with the piston, 103, which is connected by the rod, 174, with the brake mechanism in substantially the same manner as indicated for example in Fig. 1. In this construction the central chamber, 113, of the valve casing, is connected with the interior of the hollow piston rod, 105ª, by means of longitudinal grooves, 120ᵈ, conveniently formed in the reduced portion, 120ª, of the valve actuating part, 120, which is connected by the rod, 182, with the pedal in the same manner as indicated in Fig. 1. The hollow piston rod, 105ª, is provided with an aperture indicated at 114, which establishes communication between the chamber, 113, of the valve casing and the interior of the cylinder forward of the piston. The operation of this modification of our invention will be precisely the same as that previously described, and need not be repeated.

Figures 5, 6:
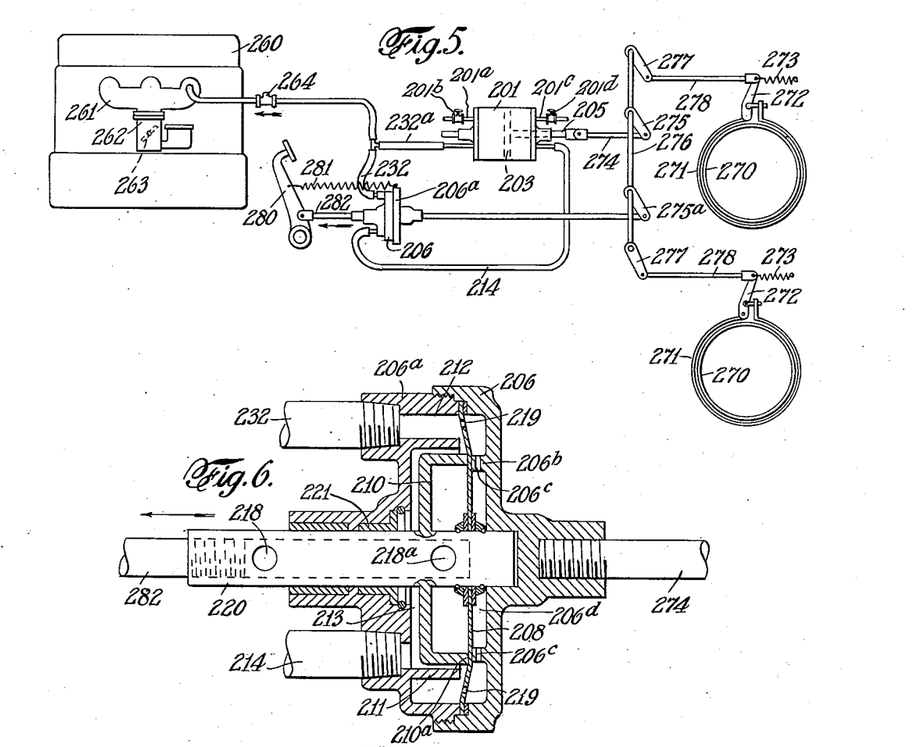
Fig. 5 is a diagrammatic view similar to Fig. 1, showing a power actuator in which the cylinder is closed at both ends, in connection with a slightly modified form of valve mechanism constructed to normally maintain the piston submerged in the lower fluid pressure.
Fig. 6 is an enlarged sectional view of the valve mechanism shown in Fig. 5, in the released position.
Figure 7:
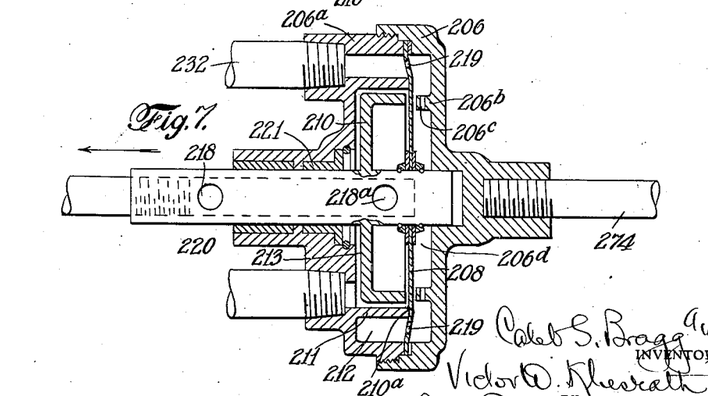
Fig. 7 is a view similar to Fig. 6, showing the parts in position to effect a power stroke of the piston.

In Figs. 5, 6 and 7, we have shown a slight modification of our invention to enable it to be applied to the operation of a power actuator in which the piston is normally maintained submerged in the lower fluid pressure, for example, suction or rarification. In these figures the parts corresponding to those in Figs. 1, 2 and 3, are given the same reference characters with the addition of 200, to avoid repetition. The power actuator comprises in this instance a cylinder, 201, closed at both ends and provided with a piston, 203, having a piston rod, 205, connected by link, 274, with brake mechanism or other part to be operated, in the same manner as indicated in Fig. 1.

The controlling valve mechanism for the actuator is located exterior to the cylinder in the linkage between the operator operated part, 280, and the brake mechanism or other part to be operated, as in Fig. 1, and comprises the valve casing, which is formed in substantially the same manner as hereinbefore described, except that the positions of the parts are reversed. The valve casing comprises the casing members, 206 and 206$^a$, the latter being provided with the annular vacuum chamber, 212, and the central chamber, 213, separated therefrom by the annular seat, 211, which is normally engaged by the diaphragm, 208, the edges of which are clamped between the casing members in sealing engagement therewith, as previously described. In this instance the casing member, 206$^a$, is connected by a pipe, 214, with the actuator cylinder in rear of the piston, and the annular suction chamber, 212, is connected by a pipe, 232, with the suction passage of the engine between the throttle valve and the engine cylinders. The portion of the cylinder 201, between the piston and the forward end of the cylinder is also connected at all times with the suction passage of the engine, as for example by the branch pipe, 232$^a$, the valve actuating part, 220, which is hollow, extends through an aperture in the casing member, 206$^a$, provided with a sealing member, 221, surrounding the part, 220, and said part is secured by means providing an air tight joint with the central portion of the diaphragm, 208, and is also similarly connected with (or formed integrally with) a disc valve, 210, having annular sealing portions, 210$^a$, for engaging the diaphragm. The casing member, 206, is in this instance provided with an annular abutment, indicated at 206$^b$, co-axial and in alignment with the sealing portions, 210$^a$, to form a stop for the rearward movement of the diaphragm under the action of the retracting means, and assisting in enabling the sealing means, 210$^a$, to make an air tight connection with the diaphragm in that position, as shown in Fig. 6, and the said abutment is conveniently provided with transverse apertures, 206$^c$, to connect the portions of the space within the casing member, 206, on the inner and outer sides of said abutment. The diaphragm, 208, is provided with one or more apertures, 219, which place the space, 206$^d$, within the casing member, 206, in rear of the diaphragm at all times in communication with the vacuum chamber, 212. The space between the disc valve, 210, and the diaphragm is at all times in communication with the atmosphere, and this is accomplished in the present instance by providing the hollow valve actuating part with an air inlet aperture, 218, outside of the valve casing, and a similar aperture, 218$^a$, located between the disc valve and the diaphragm.

In this form of our invention, when the valve mechanism is in the released position as shown in Fig. 6, and the engine is running, air will be exhausted from the cylinder forward of the piston through the branch pipe, 232$^a$, and will also be exhausted from the suction chamber, 212, and from the space, 206$^d$, of the valve mechanism, and as the diaphragm is held away from the seat, 211, the air will also be exhausted from the chamber, 213, and from the cylinder in rear of the piston through the pipe, 214, thus maintaining rarification in the cylinder on both sides of the piston and submerging the piston in vacuum or lower fluid pressure when in the off or released position. The valve casing in rear of the diaphragm is also connected with the suction chamber, 212, by the aperture, or apertures, 219, and as the space between the disc valve, 210, and the diaphragm is exposed at all times to atmospheric pressure, there is a slight tendency for the diaphragm to move in a direction away from the sealing portion, 210$^a$, of the disc valve, 210, which is prevented by the annular abutment, 206$^b$, previously described. The atmospheric pressure between the diaphragm and the disc valve acts upon said parts in opposite directions, and is thus neutralized with respect to the valve actuating part, and as the forward face of the disc valve is exposed to suction or lower fluid pressure in the released position, the fluid pressures on the diaphragm and disc valves neutralize each other, and the initial resistance required to be overcome by the operator will be merely the force of the light retracting spring, 281, for the foot lever and valve mechanism, which need only be sufficiently strong to insure the sealing engagement between the disc valve and the diaphragm. In other words, the differential of fluid pressures on the portion of the diaphragm within the sealing portions, 210$^a$, is equalized by the differential of fluid pressures on the disc valve acting in the opposite direction. When the operator depresses the pedal lever to effect a power stroke of the piston, the diaphragm will be moved into engagement with the annular seat, 211, thus closing the communication between the suction chamber, 212, and the portion of the actuator cylinder in rear of the piston, and the further movement of the pedal will move the disc valve away from the diaphragm, thus permitting the air or other higher pressure fluid to pass into the chamber, 213, and into the said portion of the cylinder. As the pressure builds up in the cylinder in rear of the piston, it will build up correspondingly in the chamber, 213, and gradually reduce the differential of fluid pressures on opposite faces of the disc valve, 210, while the differential of fluid pressures in the diaphragm remains the same, and is gradually transferred to the operator operated part as the equalizing differential of fluid pressures on the disc valve decreases, thus adding to the resistance of the retracing spring in proportion to the differential of fluid pressures in the actuator cylinder, and enabling the operator to determine accurately the extent to which the power of the actuator piston is being applied to the brake mechanism or other part to be actuated.

It will be understood that when the operator ceases to depress the foot lever, the forward movement of the piston and valve casing will close the disc valve, 210, to seat on the diaphragm and shut off the atmospheric or other higher pressure from the cylinder, thus permitting the brakes to be held as applied, and a further partial release of the foot lever sufficient to permit the diaphragm to be moved away from the seat, 211, will again connect the cylinder in rear of the piston through the suction pipe with the cylinder forward of the piston and with the suction passage of the engine, effecting an equalization of pressures within the cylinder and within the valve casing, which will permit an immediate release of the brake mechanism and the neutralization of the resistance to the pedal lever, due to the differential of fluid pressures on opposite faces of the diaphragm, 208. It will also be seen that after the brakes have been fully applied by the power actuator, the operator may, by exerting further pressure on the pedal, bring the disc, 210, which in this instance serves as a stop to limit the lost motion between the valve actuating part, 220, and the valve casing, in a forward direction, into contact with the valve casing so as to enable him to apply his physical force to the brake mechanism or other part to be operated, in addition to that of the actuator, or in case of failure of power, and upon releasing the pedal lever the valve mechanism will be restored to its original position by the retracting spring, pressures will be equalized in the actuator cylinder on opposite sides of the piston, leaving it submerged in vacuum, and the differential of fluid pressures on opposite faces of the diaphragm and the disc valve, 210, respectively, will neutralize each other, the brake mechanisms being returned to their normal position by their own retracting springs 273. It will be seen that in this form of our invention also, any force exerted by the operator to overcome the initial resistance to the movement of the pedal lever as well as the increased resistance offered by the increase in the differential of fluid pressures on the diaphragm being applied to the foot lever, will be exerted in the direction of the stroke of the piston and will be applied through the valve casing, and the link, 274, to the brake mechanism or other part to be operated.

Figure 8:
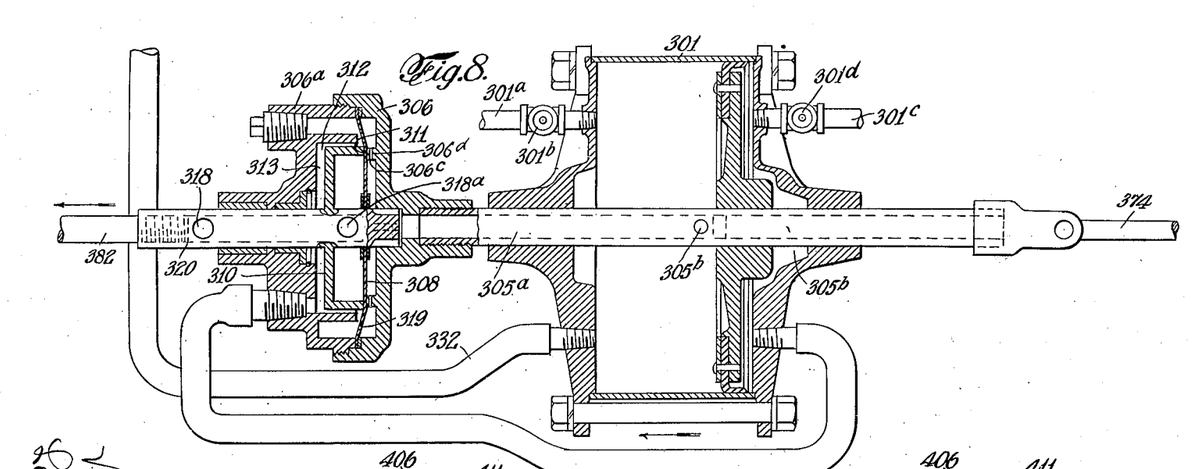
Fig. 8 is a detail view similar to Fig. 4, showing a slight modification of the valve mechanism illustrated in Figs. 6 and 7, screwed to and carried by the piston rod of the actuator.

In Figs. 8, we have shown a slight modification, similar to Fig. 4, illustrating the valve mechanism shown in Figs. 5, 6 and 7, directly connected to the piston of the actuator and carried by a hollow piston rod. In this figure the parts corresponding to those shown in Figs. 1, 2 and 3, are given the same reference numerals with the addition of 300, to avoid repetition. In this construction the actuator cylinder, 301, has a forwardly extending piston rod, 305$^a$, to which the casing member, 306, is secured, so that the hollow piston rod communicates with the space in rear of the diaphragm, and the piston rod, 305$^a$, is provided with an aperture, 305$^b$, communicating with the interior of the cylinder forward of the piston, and thus establishes communication between the suction pipe here indicated at 332, and the valve casing, so that no other vacuum or suction pipe need be employed. The chamber, 313, of the valve casing is connected by a flexible tube, 314, with the cylinder in rear of the piston. The operation of this form of the invention will be exactly the same as that previously described, except that the physical force of the operator will be applied to the brake mechanism, or other operator operated part directly through the piston and connecting rod, or link, 374.

Figure 9:
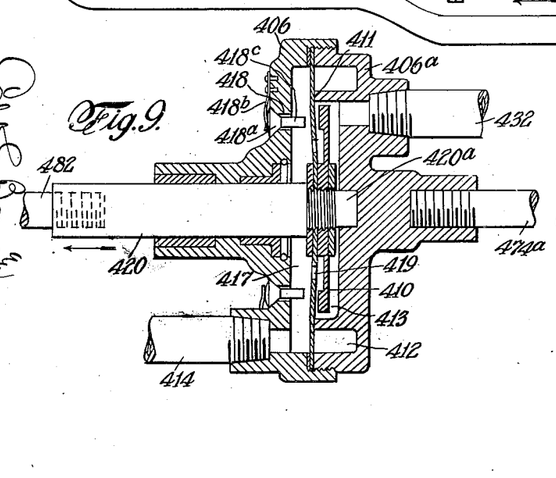
Fig. 9 is an enlarged sectional view showing a slightly modified form of the valve mechanism illustrated in Figs. 6 and 7, in released position.
Figure 10:
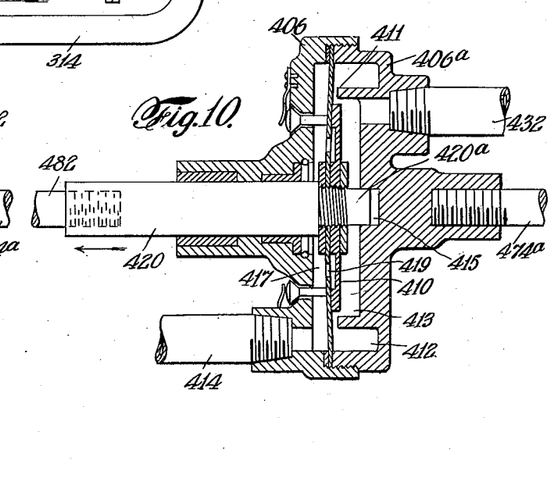
Fig. 10 is a similar view showing the parts in position to effect a power stroke of the actuator piston.

In Figs. 9 and 10, we have illustrated a slightly different form of valve mechanism for controlling an actuator of the kind illustrated in Fig. 5, in which the piston is normally submerged in vacuum. In these figures the parts corresponding to those shown and described in Figs. 2 and 3, are given the same reference characters with the addition of 400, to avoid repetition. In this construction the chamber, 413, of the casing member, 406$^a$, is connected by means of a pipe, 432, with the suction passage of the engine, and the space, 417, in the casing member 406, is connected by a pipe, 414, with the cylinder of the actuator in rear of the piston, the actuator being of the type shown in Fig. 5, and having its forward end connected at all times with the suction passage, as by a branch suction pipe, as indicated in that figure. The front wall of the casing member, 406, is provided with air inlets, 418, each of which is provided with a normally closed valve, 418$^a$, held in closed position by a spring, 418$^b$, and provided with a stem, 418$^c$, in position to be struck by the diaphragm when moved away from the annular seat, 411, by the forward movement of the foot pedal. The parts of the valve mechanism other than those just described are identical with those shown and previously described in connection with Figs. 1, 2 and 3.

In the released position of the valve mechanism indicated in Fig. 9, in which the diaphragm is seated on the seat, 411, and the disc valve, 410, is held away from the diaphragm by the retracting spring for the foot pedal, the cylinder in rear of the piston is connected with the suction pipe, 432, through apertures, 419, in the diaphragm, and as the forward end of the cylinder is always connected with the suction passage of the engine, the piston is normally maintained submerged in vacuum. The forward movement of the foot lever to apply the brakes will first bring the disc valve, 410, into engagement with the diaphragm, disconnecting the cylinder from the suction pipe, 432, and thereafter the diaphragm will be drawn forward so as to open the air inlet valve, 418ª, and connect the cylinder in rear of the piston with the atmosphere or other higher pressure fluid, to effect a power stroke of the piston to apply the brakes. When the diaphragm moves away from the seat, 411, substantially the entire rear face of the diaphragm, (and of the disc, 410, which then forms in effect a portion of the diaphragm) will be exposed to suction, while the forward face of the diaphragm previously also exposed to suction, will be exposed to a gradually increasing pressure, as the pressure in the cylinder in rear of the piston builds up, thus applying a differential of pressure in a rearward direction to the pedal lever, and enabling the operator to determined the extent to which the actuator piston is applying its power to the brake mechanism. When the foot lever is released sufficiently to allow the diaphragm to engage the seat, 411, without opening the valve, 410, the air inlet valves, 418ª, will be closed by their springs, 418ᵇ, and the brakes may be held as applied, and the differential of fluid pressures on the diaphragm will be transferred from the foot lever to the seat, 411, as previously described with reference to Figs. 1, 2 and 3. In this form of the invention, the operator can apply his physical force to the brake mechanism and apply and release the brakes in the same manner as hereinbefore described.

It will be understood in any of the forms of our invention hereinbefore described, the valve mechanism may be employed to control a single actuator, or a plurality of actuators, by employing pipe connections. As illustrative of this, we have shown in Fig. 1, for example, the cylinder, 1, provided at its forward end with a pipe, 1ª, for connecting it with the corresponding part of another or other actuator cylinder or cylinders, said pipe being provided with a cut off cock, 1ᵇ, for closing this pipe connection if an additional actuator, or actuators, is or are not employed. In like manner in Fig. 5, the cylinder, 201, is shown provided at its opposite ends with pipes, 201ª and 201ᶜ, for connecting the opposite ends of the cylinder with the corresponding portions of another actuator cylinder or cylinders, if desired, said pipes being provided with cut off valves, 201ᵇ and 201ᵈ.

In the construction shown in Fig. 4, it will be obvious that the valve mechanism may control more than one cylinder by suitable pipe connections, and as illustrating this we have shown the cylinder, 101, provided with a pipe, 101ª, which may be connected to another or other cylinders, and is shown provided with a cut off valve, 101ᵇ, which can be closed when other cylinders are not so connected. In Fig. 8 also we have shown the opposite ends of the cylinder, 301, provided with pipes, 301ª and 301ᶜ, by which the ends of the cylinder may be connected to the corresponding portions of another cylinder or cylinders, so that the single valve mechanism will operate all of them simultaneously, and said pipes are shown provided with cut off valves 301ᵇ and 301ᵈ, for closing these pipes when no other cylinders are used.

It will be seen that the valve mechanism herein shown and described is exceedingly simple and cheap to manufacture, and substantially the same parts can be used for fitting the valve mechanism for use with different type of actuators, so that the parts can be made from the same die castings with minor differences in machining and assembling, with accompanying saving in cost.

It is obvious that our invention is applicable for operating any type of actuator comprising two or more relatively movable coacting members, at least one of which is connected with a part to be operated and with the casing of the valve mechanism, the valve mechanism being connected with the actuator between opposed faces of the said coacting members.

What we claim and desire to secure by Letters Patent is:—

1. In valve mechanism for controlling power actuators, the combination with a hollow valve casing provided with means for connecting it with a portion of an actuator between opposed faces of its actuating members, and for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, a disc valve in said chamber with said seat and having sealing portions for seating upon the diaphragm and forming a separate chamber between said disc and diaphragm valves, means for placing said separate chamber in communication with the other of said fluid pressure sources, a valve actuating part operatively connected to said disc and diaphragm valves and having sealing engagement therewith, said valves coacting to connect the said portion of the actuator with one or the other of said fluid pressure sources when either of said valves is in unseated position, and to disconnect said portion of the actuator from both of said sources when both valves are seated.

2. In valve mechanism for controlling power actuators, the combination with a hollow valve casing provided with means for connecting it with a portion of an actuator between opposed faces of its co-acting members, and means for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, a disc valve in said chamber with said seat and having sealing portions for seating upon the diaphragm and forming a separate chamber between said disc and diaphragm valves, means for placing said separate chamber in communication with the other of said fluid pressure sources, a valve actuating part projecting through one of said chambers and operatively connected to said disc and diaphragm valves and having sealing engagement therewith, said valves coacting to connect the said portion of the actuator with one or the other of said fluid pressure sources when either of said valves is in unseated position, and to disconnect the said portion of the actuator from both of said sources when both valves are seated, an operator operated part connected with said valve actuating part, and yielding retracting means for said valve actuating part normally holding it in position to maintain one of said valves unseated.

3. In valve mechanism for controlling power actuators, the combination with a hollow valve casing provided with means for connecting it with a portion of an actuator between opposed faces of its coacting members, and means for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, the other compartment being in communication with said portion of the actuator, a disc valve in said chamber with said seat and having sealing portions for seating upon the diaphragm and forming a separate chamber between said disc and diaphragm valves, means for placing said separate chamber in communication with the other of said fluid pressure sources, a valve actuating part operatively connected to said disc and diaphragm valves and having sealing engagement therewith, said valves coacting to connect the said portion of the actuator with one or the other of said fluid pressure sources when either of said valves is in unseated position, and to disconnect the said portion of the actuator from both of said sources when both valves are seated, and an operator operated part connected with said valve actuating part, the movement of the operator operated part to effect a power stroke of the actuator, being resisted by the establishment of a differential of fluid pressures corresponding with the differential of fluid pressures for the operation of the actuator.

4. In valve mechanism for controlling power actuators, the combination with a hollow valve casing provided with means for connecting it with a portion of an actuator between opposed faces of its coacting members, and for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, the other compartment being in communication with said portion of the actuator, a disc valve in said chamber with said seat and having sealing portions for seating upon the diaphragm and forming a separate chamber between said valve, means for placing said separate chamber in communication with the other of said fluid pressure sources, a valve actuating part operatively connected to said disc and diaphragm valves and having sealing engagement therewith, said valves coacting to connect the said portion of the actuator with one or the other of said fluid pressure sources when either of said valves is in unseated position, and to disconnect the said portion of the actuator from both of said sources when said valves are seated, an operator operated part connected with said valve actuating part, and yielding retracting means for said valve actuating part normally holding it in position to maintain one of said valves unseated, to equalize pressures on effective pressure areas of said disc valve and co-operating portion of said diaphragm valve, the movement of the operator operated part to seat said normally unseated valve and to open the seated valve, subjecting the diaphragm to a differential of fluid pressures corresponding with that in the actuator and exerted upon the operator operated part in a direction opposed to the movement thereof.

5. In valve mechanism for controlling power actuators, the combination with a hollow valve casing provided with means for connecting it with a portion of an actuator between opposed faces of its coacting members and for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, a disc valve in said chamber with said seat and having sealing portions for seating upon the diaphragm and forming a separate chamber in communication with the other of said fluid pressure sources, the valve actuating part being operatively connected to the disc and diaphragm valves, and having sealing engagement therewith, said valves coacting to connect the said portion of the actuator with one or the other of said fluid pressure sources when either of said valves is in unseated position, and to disconnect the said portion of the actuator from both of said sources when both valves are seated, an operator operated part connected with said valve actuating part, and yielding retracting means for said valve actuating part normally holding it in position to maintain one of said valves unseated, to equalize pressure on effective pressure areas of said disc valve and co-operating portion of said diaphragm valve, the movement of the operator operated part to open the seated valve after seating said normally unseated valve, subjecting the diaphragm to a differential of fluid pressures corresponding with that in the actuator and exerting said force upon the operator operated part in a direction opposed to the movement thereof, means for connecting the valve casing to the part to be operated by the power actuator, whereby the force exerted by the operator to overcome said differential of fluid pressure on the diaphragm is transmitted through the valve casing to the part to be operated.

6. In valve mechanism for controlling power actuators, the combination with a hollow valve casing provided with means for connecting it with a portion of an actuator between opposed faces of its co-acting members, and means for independently connecting it with sources of higher and lower pressures, of a diaphragm valve dividing said casing into two chambers, a diaphragm engaging seat in one of said chambers dividing said chamber when the diaphragm valve is seated into two compartments, one of which is in communication with one of said fluid pressure sources, the other compartment being in communication with said portion of the actuator, a disc valve in said chamber with said seat and having sealing portions for seating upon the diaphragm and forming a separate chamber between said valves, means for placing said separate chamber in communication with the other of said fluid pressure sources, the valve actuating part being operatively connected to the disc and diaphragm valves and having sealing engagement therewith, said valves coacting to connect the said portion of the actuator with one or the other of said fluid pressure sources when either of said valves is in unseated position, and to disconnect the said portion of the actuator from both of said sources when both valves are seated, an operator operated part connected with said valve actuating part, and yielding retracting means for said valve actuating part normally holding it in position to maintain one of said valves unseated, to equalize pressures on effective pressure areas of said disc valve and cooperating portion of said diaphragm valve, the movement of the operator operated part to open the seated valve after seating said normally unseated valve, subjecting the diaphragm to a differential of fluid pressures corresponding with that in the actuator and exerted upon the operator operated part in a direction opposed to the movement thereof, means for connecting the valve casing to the part to be operated by the power actuator, and means for limiting the movement of the valve actuating part with respect to the valve casing, to enable the power of the operator to apply his physical force to the part to be operated in addition to the power exerted by the actuator and in case of failure of power.

7. In valve mechanism for power actuators operated by the differential of higher and lower fluid pressures, and comprising relatively movable coacting members, the combination with a hollow valve casing, of a diaphragm valve dividing said casing into two chambers, a valve seat in one of said chambers adapted to engage said diaphragm and thereby dividing the chambers into two compartments, means for connecting one of said compartments with one fluid pressure source, means for connecting the other compartment with a portion of the actuator between opposed faces of said coacting members, a disc valve located within said chamber with said seat and provided with sealing portions adapted to seat on the same side of said diaphragm valve as said seat, and forming a separate chamber between said disc valve and diaphragm, means for connecting said separate chamber with the other fluid pressure source, a valve actuating part connected with said disc and diaphragm valves and having sealing engagement therewith, an operator operated part connected with the valve actuating part, and means for normally holding said valves yieldingly in position to connect one of said sources of fluid pressure with the said portion of the actuator.

8. In valve mechanism for power actuators operated by the differential of higher and lower fluid pressures, and comprising relatively movable coacting members, the combination with a hollow valve casing, of a diaphragm valve dividing said casing into two chambers, a valve seat in one of said chambers adapted to engage said diaphragm and thereby divide said chambers into two compartments, means for connecting one of said compartments with one fluid pressure source, means for connecting the other compartment with a portion of the actuator between opposed faces of said coacting members, a disc valve located within said chamber of the casing and provided with sealing portions adapted to seat on the same side of said diaphragm as said seat, and forming a separate chamber between said disc valve and diaphragm, said diaphragm having an aperture therein, establishing communication between said separate chamber and the casing chamber on the opposite side of the diaphragm, means for connecting said last named casing chamber with the other of said pressure sources, a valve actuating part connected with said disc and diaphragm valves in sealing engagement therewith, an operator operated part connected with the valve actuating part, and means for normally holding said valves yieldingly in position to connect one of said fluid pressure sources with the said portion of the actuator.

9. In valve mechanism for power actuators operated by the differential of higher and lower fluid pressures, and comprising relatively movable coacting members, the combination with a hollow valve casing formed of two members provided with means for uniting them, a diaphragm valve having its marginal portions sealingly clamped between said members, and dividing the casing into two chambers, an annular seat in one of said chambers for engaging the diaphragm valve and thereby dividing the chamber into separate coaxial compartments, means for connecting one compartment with one of said fluid pressure sources, means for connecting the other compartment with a portion of said actuator between opposed faces of said coacting members, a disc valve within said second mentioned compartment and coaxial therewith, having annular sealing portions for seating upon the diaphragm valve and forming a separate chamber between said valves, means for connecting said separate chamber with the other fluid pressure source, said disc valve being provided with an actuating part extending through one side of the valve casing and having sealing engagement with said diaphragm valve, yielding resistance means for normally holding one of said valves in seated position and the other in unseated position to maintain an equalization of fluid pressures with respect to the actuator, and an operator operated part connected with said valve actuating part.

10. In valve mechanism for power actuators operated by the differential of higher and lower fluid pressures, and comprising relatively movable coacting members, the combination with a hollow valve casing formed of two members provided with means for uniting them, a diaphram valve having its marginal portions sealingly clamped between said members, and dividing the casing into two chambers, an annular seat in one of said chambers for engaging the diaphragm valve and thereby dividing the chamber into separate coaxial compartments, means for connecting one compartment with one of said fluid pressure sources, means for connecting the other compartment with a portion of said actuator between opposed faces of said coacting members, a disc valve within said second mentioned compartment and coaxial therewith, having annular sealing portions for seating upon the diaphragm valve and forming a separate chamber between said valves, means for connecting said separate chamber with the other fluid pressure source, said disc valve being provided with an actuating part extending through one side of the valve casing and having sealing engagement with said diaphragm valve, yielding resistance means for normally holding one of said valves in seated position and the other in unseated position, to maintain an equalization of fluid pressures with respect to the actuator, and an operator operated part connected with said valve actuating part, means for connecting the valve casing with a part to be operated by the power actuator, and means for limiting the movement of the valve actuating part with respect to the valve casing, to enable the operator to apply his physical force to said part to be operated in addition to the power of the actuator or in case of failure of power.

11. In brake mechanism for an automotive vehicle, the combination with a power actuator comprising relatively movable coacting members, one of which is provided with means for connecting said actuator with brake mechanism of the vehicle, of controlling valve mechanism for said actuator comprising a hollow valve casing, independent means for connecting said casing with sources of higher and lower fluid pressures, a diaphragm valve dividing said casing into two chambers, a valve seat in one chamber dividing it into two compartments when the diaphragm valve is seated, one of said compartments being in communication with one of said fluid pressure sources, means for connecting the other compartment with a portion of said actuator between opposed faces of said coacting members, a disc valve in said chamber having sealing portions for seating upon the diaphragm valve, and forming a separate chamber between said valves communicating with the other source of fluid pressure, and a valve actuating part operatively connected to said disc and diaphragm valves and having sealing engagement therewith, said parts being constructed to connect the actuator cylinder with one or the other source of fluid pressures when either of said valves is unseated, and to disconnect the cylinder from both sources of fluid pressures when both valves are seated.

12. In brake mechanism for an automotive vehicle, the combination with a power actuator comprising relatively movable coacting members, one of which is provided with means for connecting said actuator with brake mechanism of the vehicle, of controlling valve mechanism for said actuator comprising a hollow valve casing, independent means for connecting said casing with sources of higher and lower fluid pressures, a diaphragm valve dividing said casing into two chambers, a valve seat in one chamber dividing it into two compartments when the diaphragm valve is seated, one of said compartments being in communication with one of said fluid pressure sources, means for connecting the other compartment with the actuator between opposed faces of said coacting members, a disc valve in said chamber having sealing portions for seating upon the diaphragm valve, and forming a separate chamber between said valves communicating with the other source of fluid pressure, and a valve actuating part operatively connected to the disc and diaphragm valves and having sealing engagement therewith, said parts being constructed to connect the said portion of the actuator with one or the other source of fluid pressures when either of said valves is unseated, and to disconnect the said portion of the actuator from both sources of fluid pressures when both valves are seated, an operator operated part connected with said valve actuating part, said valve actuating part being normally maintained in position to hold one of said valves in unseated position.

13. In brake mechanism for an automotive vehicle, the combination with a power actuator comprising relatively movable coacting members, one of which is provided with means for connecting said actuator with brake mechanism of the vehicle, of controlling valve mechanism for said actuator comprising a hollow valve casing, and independent means for connecting said casing with sources of higher and lower fluid pressures, a diaphragm valve dividing said casing into two chambers, a valve seat in one chamber dividing it into two compartments when the diaphragm valve is seated, one of said compartments being in communication with one of said fluid pressure sources, and the other compartment being connected with said actuator between opposite faces of said coacting members, a disc valve in said chamber having sealing portions for seating upon the diaphragm valve, and forming a separate chamber between said valves communicating with the other source of fluid pressure, and a valve actuating part operatively connected to the disc and diaphragm valves and having sealing engagement therewith, said parts being constructed to connect the said portion of the power actuator with one or the other source of fluid pressures when either of said valves is unseated, and to disconnect the said portion of the actuator from both sources of fluid pressures when both valves are seated, and an operator operated part connected with said valve actuating part, a movement of the operator operated part to effect a stroke of the actuator to apply the brake mechanism, subjecting the diaphragm to a differential of fluid pressures corresponding with the differential of fluid pressures in the actuator and exerted upon the operator operated part in opposition to the movement thereof.

14. In brake mechanism for an automotive vehicle, the combination with a power actuator comprising relatively movable coacting members, one of which is provided with means for connecting said actuator with brake mechanism of the vehicle, of controlling valve mechanism for said actuator comprising a hollow valve casing, independent means for connecting said casing with sources of higher and lower fluid pressures, a diaphragm valve dividing said casing into two chambers, a valve seat in one chamber dividing it into two compartments when the diaphragm valve is seated, one of said compartments being in communication with one of said fluid pressure sources, means for connecting the other compartment with a portion of the actuator between opposed faces of said coacting members, a disc valve in said chamber having sealing portions for seating upon the diaphragm valve, and forming a separate chamber between said valves communicating with the other source of fluid pressure, and a valve actuating part operatively connected to the disc and diaphragm valves and having sealing engagement therewith, said parts being constructed to connect the said portion of the actuator with one or the other source of fluid pressures when either of said valves is unseated, and to disconnect the said portion of the actuator from both sources of fluid pressures when both valves are seated, an operator operated part connected with said valve actuating part, means for connecting the valve casing to the brake mechanism of the vehicle, the movement of the operator operated part to effect a power stroke of the actuator, subjecting the diaphragm to a differential of fluid pressures, corresponding with that in the actuator and exerted upon the operator operated part in opposition to the movement thereof, the force of the operator exerted to overcome said resistance being applied to the brake mechanism.

15. In brake mechanism for an automotive vehicle, the combination with a power actuator comprising relatively movable coacting members, one of which is provided with means for connecting said actuator with brake mechanism of the vehicle, of controlling valve mechanism for said actuator comprising a hollow valve casing, independent means for connecting said casing with sources of higher and lower fluid pressures, a diaphragm valve dividing said casing into two chambers, a valve seat in one chamber dividing it into two compartments when the diaphragm valve is seated, one of said compartments being in communication with one of said fluid pressure sources, means for connecting the other compartment with a portion of said actuator between opposed faces of said coacting members, a disc valve in said chamber having sealing portions for seating upon the diaphragm valve, and forming a separate chamber between said valves communicating with the other source of fluid pressure, and a valve actuating part operatively connected to the disc and diaphragm valves and having sealing engagement therewith, said parts being constructed to connect the said portion of the actuator with one or the other source of fluid pressures when either of said valves is unseated, and to disconnect the said portion of the actuator from both sources of fluid pressure when both valves are seated, an operator operated part connected with said valve actuating part, means for connecting the valve casing to the brake mechanism of the vehicle, the movement of the operator operated part to effect a power stroke of the actuator, subjecting the diaphragm to a differential of fluid pressures, corresponding with that in the actuator and exerted upon the operator operated part in opposition to the movement thereof, the force of the operator exerted to overcome said resistance being applied to the brake mechanism, and means for limiting the movement of the valve actuating part with respect to the valve casing, to enable the operator to apply his physical force to the brake mechanism in addition to the power exerted by the actuator and in case of failure of power.

16. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm valve and thereby dividing said chamber into two compartments, one of which communicates with one of said fluid pressure sources, means for connecting the other of said compartments with a portion of said actuator between opposed faces of said coacting members, a disc valve in said chamber having sealing portions for seating upon the diaphragm valve and forming a separate chamber between said valves, means for placing said separate chamber in communication with the other fluid pressure source, a valve actuating part, operatively connected with the disc and diaphragm valves and having sealing engagement therewith, said parts being constructed to connect the said portion of the actuator with one or other of said sources of fluid pressure when either of said valves is in unseated position, and to disconnect the cylinder from both sources of fluid pressure when both valves are seated, and an operator operated part connected with said valve actuating part.

17. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm and thereby dividing said chamber into two compartments, one of said compartments communicating with one of said fluid pressure sources, means for connecting the other compartment with a portion of said actuator between opposed faces of said coacting members, a disc valve in said chamber having sealing portions for seating upon the diaphragm valve and forming a separate chamber in communication with the other fluid pressure source, a valve actuating part, operatively connected with the disc and diaphragm valves, and having sealing engagement therewith, said parts being constructed to connect the actuator cylinder with one or other of said sources of fluid pressure when either of said valves is in unseated position, and to disconnect the cylinder from both sources of fluid pressure when both valves are seated, an operator operated part connected with said valve actuating part, said valve actuating part being normally maintained yieldingly in position to hold one of said valves unseated to maintain said actuator in a state of equalization.

18. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm and thereby dividing said chamber into two compartments, one of said compartments communicating with one of said fluid pressure sources, means for connecting the other compartment with a portion of the actuator between opposed faces of said coacting members, a disc valve in said chamber having sealing portions for seating upon the diaphragm valve and forming a separate chamber between said valves, means for placing said separate chamber in communication with the other fluid pressure source, a valve actuating part, operatively connected with the disc and diaphragm valves and having sealing engagement therewith, said parts being constructed to connect the actuator cylinder with one or other of said sources of fluid pressure when either of said valves is in unseated position, and to disconnect the cylinder from both sources of fluid pressure when both valves are seated, and an operator operated part connected with said valve actuating part, the movement of the operator operated part to close one of said valves and unseat the other valve, being resisted by a differential of fluid pressures on said diaphragm corresponding with the differential of fluid pressures in the actuator and tending to move the seated and unseated valves in a direction to reverse their positions to equalize pressures with respect to the actuator, and yielding means to normally hold the valves in their normal positions when pressures are equalized on the effective pressure areas of said valves.

19. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm and thereby dividing said chamber into two compartments, one of which communicates with one of said fluid pressure sources, means for connecting the other of said compartments with a portion of the actuator between opposed faces of said coacting members, a disc valve in said chamber having sealing portions for seating upon the diaphragm valve and forming a separate chamber in communication with the other fluid pressure source, a valve actuating part, operatively connected with the disc and diaphragm valves and having sealing engagement therewith, said parts being constructed to connect the actuator cylinder with one or other of said sources of fluid pressure when either of said valves is in unseated position, and to disconnect the cylinder from both sources of fluid pressure when both valves are seated, and an operator operated part connected with said valve actuating part, the movement of the operator operated part to close one of said valves and unseat the other valve, being resisted by a differential of fluid pressures on said diaphragm corresponding with the differential of fluid pressures in the actuator and tending to move the seated and unseated valves in a direction to reverse their positions to equalize pressures with respect to the actuator, and yielding means to normally hold the valves in their normal positions when pressures are equalized on the effective pressure areas of said valves, and means for connecting the valve casing with the brake mechanism, whereby the force exerted by the operator to overcome the said resistance to the movement of the operator operated part will be transmitted to the brake mechanism.

20. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm and thereby dividing said chamber into two compartments, one of which communicates with one of said fluid pressure sources, means for connecting the other of said compartments with a portion of the actuator between opposed faces of the coacting members, a disc valve in said chamber having sealing portions for seating upon the diaphragm valve and forming a separate chamber between said valves, means for placing said separate chamber in communication with the other fluid pressure source, a valve actuating part, operatively connected with the disc and diaphragm valves and having sealing engagement therewith, said parts being constructed to connect the said portion of the actuator with one or other of said sources of fluid pressure when either of said valves is in unseated position, and to disconnect the cylinder from both sources of fluid pressure when both valves are seated, and an operator operated part connected with said valve actuating part, means for connecting the valve casing to the brake mechanism, and means for limiting the movement of the valve actuating part with respect to the casing, to enable the operator to apply his physical force to the brake mechanism in addition to the power exerted by the actuator and in case of failure of power.

21. In brake mechanism for automotive vehicles provided with an internal combustion engine having a throttle controlled suction passage connecting the carburetor and the engine cylinder, the combination with a power actuator comprising relatively movable coacting members, means for connecting said actuator with brake mechanism of the vehicle, of controlling valve mechanism for the actuator comprising a hollow valve casing, independent means for connecting said casing with the suction passage of the engine and with a source of higher pressure, a diaphragm valve dividing said casing into two chambers, a valve seat in one chamber for engaging the diaphragm and thereby dividing said chamber into two compartments, one of which communicates with one of said fluid pressure sources, means for connecting the other of said compartments with a portion of the actuator between opposed faces of said coacting members, a disc valve in said chamber having sealing portions for seating upon the diaphragm valve and forming a separate chamber between said valves, means for placing said separate chamber in communication with the other fluid pressure source, a valve actuating part, operatively connected with the disc and diaphragm valves and having sealing engagement therewith, said parts being constructed to connect the said portion of the actuator with one or other of said sources of fluid pressure when either of said valves is in unseated position, and to disconnect the cylinder from both sources of fluid pressure when both valves are seated, an operator operated part connected with said valve actuating part, the movement of the operator operated part to seat one valve and unseat the other to effect a power stroke of the actuator to apply the brake mechanism being resisted by a differential of fluid pressure on the diaphragm corresponding with the differential of fluid pressures in the actuator, and tending to move the seated and unseated valves in a direction to reverse their positions to equalize pressures with respect to the actuator, and yielding means to normally hold the valves in their normal positions when pressures are equalized on the effective pressure areas of said valves, means for connecting the valve casing to the brake mechanism, and means for limiting the movement of the valve actuating part with respect to the valve casing, to enable the operator to apply his physical force to the brake mechanism in addition to the power of the actuator and in case of failure of power.

In testimony whereof we affix our signatures.

CALEB S. BRAGG.
VICTOR W. KLIESRATH.